March 13, 1928. 1,662,519
A. F. JENKINS
CUTTING AND WELDING TORCH
Filed May 28, 1926
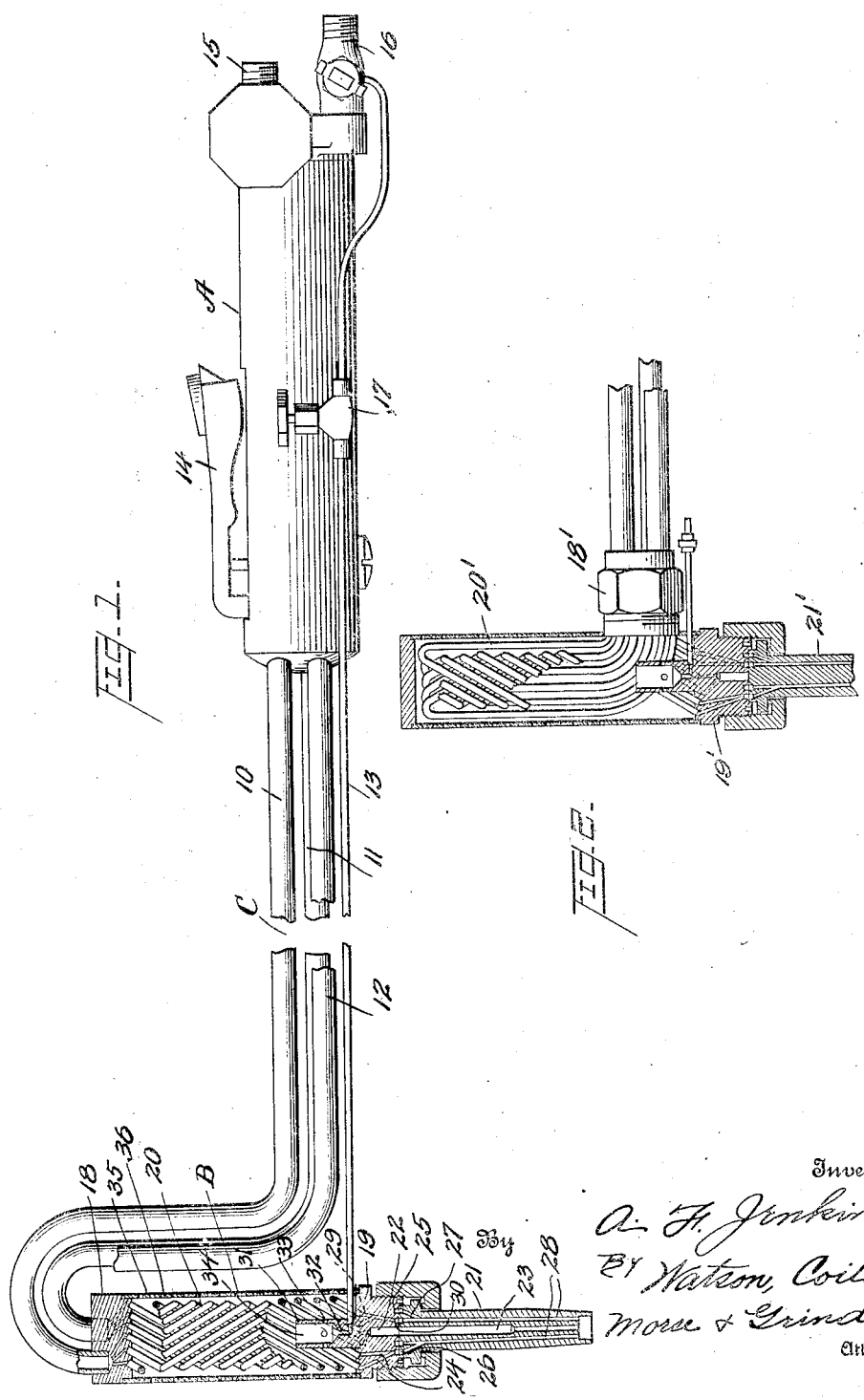

Patented Mar. 13, 1928.

1,662,519

UNITED STATES PATENT OFFICE.

ALEXANDER F. JENKINS, OF BALTIMORE, MARYLAND.

CUTTING AND WELDING TORCH.

Application filed May 28, 1926. Serial No. 112,354.

The present invention relates to cutting and welding torches and particularly to torches of this class which are provided with means for preheating the combustible or combustion supporting gases prior to their ignition.

It has been demonstrated that increased efficiency in welding and cutting operations may be brought about by preheating the gaseous ingredients which support the combustion, when certain types of gases are employed as fuel. For instance, it has been demonstrated that cutting and welding operations may be carried out with ordinary illuminating gases with great efficiency when the fuel gases, and particularly the oxygen supplied to support combustion, are preheated prior to the time of actual combustion. Such preheating has not only effected, through expansion of the gases flowing to the torch head, great economy of gas consumption, but has also brought about increased efficiency of operation, a cutting operation, for instance, carried out with a heating jet of oxygen and illuminating gas, both of which are preheated, and a cutting jet of oxygen preheated by suitable means, being much superior to that where the operation is carried out with cold gases, the cutting being remarkably smooth so that it is possible to actually cut shapes from a block or sheet of metal leaving smooth even edges.

The object of my invention is to provide a torch provided with novel means for effecting the preheating of the gases flowing to the cutting or welding tip. By means of my novel gas preheating device, heat is applied to the gases just prior to their issuance from the tip, that is, just before they reach the point at which they are burned, so that the gases are burned before they have had time to cool. They, therefore, issue from the tip of the torch at high temperature and all the advantages of preheating may be realized. The torch is so constructed that the preheating means is positioned at a distance from the handle so that, notwithstanding the fact that a considerable portion of the torch must necessarily be quite hot when the torch is in operation, the user may freely grasp and manipulate it without danger of being burned. It is a further object of the invention to provide a torch of this character which may be made, if desired, largely of standard parts now in common use in the manufacture of cutting and welding torches.

It will be observed from an inspection of the accompanying drawings, and from the following description of the torches illustrated, that the invention may be carried out in various ways, the design and arrangement of the component elements being susceptible of considerable modification without departure from the spirit of the invention. That form or embodiment which is illustrated, and hereinafter described at length, is given by way of example only.

In the drawings:

Figure 1 is a side elevation of a torch, in this instance a cutting torch, the head being shown in axial section; and Figure 2 is an axial section through a modified form of torch head, the tip illustrated being a welding tip.

The torch comprises essentially the handle portion indicated generally at A, the head portion indicated generally at B, and the group of connecting tubes indicated generally at C, which not only serve to conduct the gaseous fuel from the handle to the head but also serve to support the head in fixed space relation to the handle. The tubes C are four in number, three of them, that is the three larger tubes or conduits 10, 11 and 12, constituting conduits for cutting oxygen, combustible gas and heating oxygen, respectively, the fourth tube, which is indicated at 13 being much smaller and designed to conduct a relatively small flow of combustible gas to the head for the purpose of preheating the gases flowing through the other three tubes.

The handle A is of well known construction and its details need not be described. It is provided with the usual operating lever 14 which controls the valve regulating the flow of cutting oxygen to the head of the torch and has at one end couplings 15 and 16 to which oxygen and gas supply pipes or tubes respectively may be connected. The rear end of the small tube 13 is in communication with the gas coupling 16 and a small valve 17 intermediate the ends of this conduit is provided for cutting off the flow of combustible gas therethrough, when desired.

The head of the torch B is of novel construction and will now be described. Two metallic cylindrical blocks 18 and 19 are connected by a series of small tubes 20, these tubes being spirally arranged and having their opposite ends firmly anchored in the respective blocks. They constitute, in addition to means for conducting oxygen and combustible gas from block 18 to block 19, the means whereby block 19 is supported from block 18 in fixed space relation thereto. Each of the pipes 10, 11 and 12 communicates with the upper ends of a plurality of smaller tubes 20 through conduits formed in block 18 and the lower ends of these tubes communicate with conduits in block 19 which in turn open into conduits or ducts in the tip 21 of the torch. Thus the series of helical tubes 20 which, at their upper ends, communicate with the cutting oxygen tube 10, communicate at their lower ends with the central duct 22 formed in head 19, which duct opens into a similar duct 23 of tip 21 which in turn finally opens to the atmosphere at the lower end of the tip. Thus cutting oxygen flowing forwardly through tube 10 will be, upon reaching the block 18, subdivided into a plurality of small streams flowing through a number of the smaller tubes 20 but, upon reaching the second block 19 these streams will be reunited so that the cutting oxygen again flows in a single stream and issues from the orifice in the end of the tip as such.

In like manner, the stream of combustible gas flowing forwardly through pipe 11 is subdivided at 18 and reunited at 19, the lower ends of the series of small tubes 20 with which the forward end of combustible gas tube 11 is in communication having their lower ends in communication with ducts 24, all of which open into a circular groove 25 in the lower end of block 19 and this groove being in communication with a second groove 26 in the tip. Inclined ducts 27 permit the gas to flow from groove 26 into mixing ducts or conduits 28 and from these conduits the gas escapes to the atmosphere at the end of the tip.

In exactly the same way the oxygen flowing forwardly through pipe 12 is subdivided at 18, passes downwardly through a plurality of tubes 20 the lower ends of which communicate with ducts 29 in block 19, which ducts in turn open into the circular grooves 30. From these grooves the oxygen passes into the tip, intermingling with the combustible gas flowing through ducts 27, passing through the mixing ducts 28 and finally emerging at the end of the tip.

Arranged axially of the head and forming an integral portion of block 19 is a burner 31 of the Bunsen type having an axial gas opening or port 32 and a series of air ports 33. The gas flowing through the small tube 13 is discharged into the base of this burner and flows upwardly through central port 32 into a chamber 34 where it mingles with air entering through apertures 33, and is burned. The heat of this gas burner is transferred in large part to the tubes 20 by radiation and convection and these tubes become sufficiently warm to preheat the gases flowing through them to a very considerable degree. A cylindrical envelope for tubes 20 is indicated at 35 and this envelope may conveniently comprise a cylindrical sheet of metal provided with a large number of holes 36 through which air may have access to the burner and the products of combustion thereof escape.

In the form of the invention shown in Figure 2 the tubes 20' instead of being helical throughout their entire length are in part straight and the blocks 18' and 19' instead of being disposed in axial arrangement are at right angles to each other. The remaining portions of the torch are, however, the same as illustrated in Figure 1, with the exception of the tip and in this case I show a welding tip 21' attached to the head instead of the cutting tip 21 illustrated in Figure 1. By the arrangement of tube 20' as shown in Figure 2 an increased heating surface is provided so that the gases may be made somewhat hotter than in the form shown in Figure 1. For certain uses of the torch also, the arrangement of tubing 20' of Figure 2 is more convenient.

It will be apparent that the invention may be embodied in still other forms, and I do not therefore limit myself to any physical embodiment thereof except as generally described in the appended claims.

Having thus described the invention, what is claimed as new and desired to be secured by Letters Patent is:

1. A torch head comprising a block provided with inlet ducts, a block provided with outlet ducts, a plurality of small tubes connecting said inlet ducts with said outlet ducts, said tubes being disposed to form a substantially cylindrical cage, a burner adapted to project a flame within said cage, and an envelope surrounding said cage of tubes, said envelope being perforated to provide means of egress for products of combustion.

2. A torch head comprising a pair of cylindrical blocks provided with a plurality of ducts therethrough, a plurality of small tubes disposed in helical coils, said tubes effecting communication between the inner ends of the ducts in the said blocks, gas conduits communicating with the outer ends of the ducts in one of said blocks, means for affixing a burner tip with inlet apertures in registry with the outer ends of the ducts in the other of said blocks, a gas burner integral with the said block adjacent to the burner tip, said burner being adapted to project a flame within the space enclosed by the coiled tubes, and coaxial therewith, means for supplying said burner with combustible gas, and a cylindrical envelope surrounding the coil of small tubes and affixed to the said blocks, said envelope being perforated to allow the escape of products of combustion formed by the gas burner.

In testimony whereof I hereunto affix my signature.

ALEXANDER F. JENKINS.